(12) United States Patent
Erkens et al.

(10) Patent No.: US 6,444,025 B1
(45) Date of Patent: Sep. 3, 2002

(54) RED-TINGED BISMUTH VANADATE PIGMENTS

(75) Inventors: Leonardus Johannes Hubertus Erkens, Maastricht; Gregor Schmitt, Landgraaf; Hendrikus Maria Anna Hamers, Selfkant; Johannes Maria Martinus Luijten, Bocholtz; Jozef Gertruda Emanuel Mains, Nieuwstadt; Helena Francisca Maria Schulpen-Vleugels, Guttecoven, all of (NL)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

(21) Appl. No.: 09/786,964

(22) PCT Filed: Sep. 22, 1999

(86) PCT No.: PCT/EP99/07050
§ 371 (c)(1),
(2), (4) Date: Mar. 12, 2001

(87) PCT Pub. No.: WO00/20515
PCT Pub. Date: Apr. 13, 2000

(30) Foreign Application Priority Data
Oct. 1, 1998 (CH) .............................................. 1993/98

(51) Int. Cl.[7] .......................... C09C 1/00; C01G 39/00; C01G 31/00
(52) U.S. Cl. ...................... 106/479; 106/451; 106/461; 106/466; 524/406; 524/408
(58) Field of Search ................................ 106/479, 451, 106/461, 466; 524/406, 408

(56) References Cited

U.S. PATENT DOCUMENTS

| | | | |
|---|---|---|---|
| 3,370,971 A | 2/1968 | Linton | 106/298 |
| 3,639,133 A | 2/1972 | Linton | 106/298 |
| 4,046,588 A | 9/1977 | Einerhand et al. | 106/298 |
| 4,752,460 A | 6/1988 | Herren | 423/593 |
| 5,123,965 A | 6/1992 | Herren et al. | 106/462 |
| 5,186,748 A | 2/1993 | Erkens et al. | 106/479 |
| 5,203,917 A | 4/1993 | Schwochow | 106/479 |
| 5,399,197 A | 3/1995 | Vermoortele et al. | 106/479 |
| 5,753,028 A | 5/1998 | Ochmann et al. | 106/479 |
| 5,853,472 A | 12/1998 | Erkens et al. | 106/479 |
| 5,958,126 A | 9/1999 | Adel et al. | 106/479 |

FOREIGN PATENT DOCUMENTS

| | | |
|---|---|---|
| EP | 0492244 | 7/1992 |
| EP | 0810269 | 12/1997 |

OTHER PUBLICATIONS

Derwent Abstr. AN 1993-365426 for JP 05271568 (Oct 1993).

Primary Examiner—Anthony J. Green
(74) Attorney, Agent, or Firm—David R. Crichton

(57) ABSTRACT

Zirconium-containing, red-tinged bismuth vanadate pigments of general formula I, $$BiV_bO_x \cdot Ca_c(MoO_4)_d \cdot Zr_eSi_fO_y \cdot F_z \qquad I$$

wherein the variables have the following meanings:
b 0.8 to 1.5;
c 0 to 0.3;
d 0 to 0.3;
e 0.01 to 0.3;
f 0 to 0.3;
x (3/2+5b/2);
y (2e+2 f);
z 0.001 to 0.5, and a process for the preparation thereof and the use thereof in pigmenting high molecular weight organic materials such as surface-coatings, plastics and printing inks.

19 Claims, No Drawings

RED-TINGED BISMUTH VANADATE PIGMENTS

The present invention relates to red-tinged bismuth vanadate pigments, to a process for the preparation thereof and to the use thereof in pigmenting high molecular weight organic materials such as surface-coatings, plastics and printing inks.

There is a great need to replace the conventional heavy-metal-containing yellow pigments, such as lead chromate and cadmium sulfide, with pigments that are free from toxicological concern.

Bismuth vanadate pigments constitute a new class of yellow pigments that are free from toxicological concern. Hitherto, however, only green-tinged bismuth vanadate pigments have been of major industrial interest, because the red-tinged pigments are generally too dull and weak in colour. Red-tinged bismuth vanadate pigments having good properties in terms of application technology are described in DE-A 19 529 837 and EP-A 839 874. In the case of the former, the pigments are iron-containing bismuth vanadate pigments, the colour space of which (based on the L*C*h system of the Commission Internationale de l'Eclairage) is, however, limited to brightness values L* of <78, to colour angles (hue) h of from 78 to 85 and to chroma values C* of >85.

EP-A 839 874 describes bismuth vanadate pigments that can additionally contain phosphate and likewise have only low brightness values of <75.

Elements that are free from toxicological concern include, for example, zirconium. Bismuth vanadate pigments that contain zirconium are, for example, known from U.S. Pat. No. 5,399,197. However, those pigments are green-tinged yellow bismuth vanadate pigments.

Although EP-B 492 244 mentions green- and red-tinged yellow zirconium-containing bismuth vanadate pigments, the implementation examples describe only green-tinged yellow pigments. Furthermore, the person skilled in the art will infer from Example 6 that, with a zirconium content of 0.05 part relative to 1 part of bismuth, it is possible to obtain only a very pale yellow pigment.

The incorporation of molybdates, such as calcium molybdate, into the bismuth vanadate pigments is also free from toxicological concern. EP-A 239 526 describes molybdenum-containing bismuth vanadate pigments which are also, however, only green-tinged yellow.

For individual and especially for combination colourations there is a need to extend the colour space with further bismuth vanadate pigments. In particular, pigments are required that, without loss of colour strength, have greater colour angles and brightness values than the known red-tinged bismuth vanadate pigments.

The aim of the present invention was therefore to provide further red-tinged bismuth vanadate pigments that are free from toxicological concern, that extend the previously obtainable colour space and colour angle, and that have improved colouristic properties and improved properties in terms of application technology.

The invention accordingly relates to zirconium-containing red-tinged bismuth vanadate pigments of formula I, $$BiV_bO_x \cdot Ca_c(MoO_4)_d \cdot Zr_eSi_fO_y \cdot F_z \qquad I$$

wherein the variables have the following meanings:
b 0.8 to 1.5; preferably 1.1 to 1.5 and very especially 1.25 to 1.5;
c 0 to 0.3;
d 0 to 0.3;
e 0.01 to 0.3;
f 0 to 0.3;
x (3/2+5 b/2);
y (2e+2 f);
z 0 to 1.0; especially 0.05 to 0.7 and very especially 0.3 to 0.5.

Preference is given to red-tinged bismuth vanadate pigments of formula I according to the invention having brightness values L* in the range from 79 to 91, preferably from 81 to 87, or/and colour shade angles h of from 82 to 91, preferably from 84 to 89.

Special preference is given to zirconium-containing red-tinged bismuth vanadate pigments of formula I wherein the variables have the following meanings:
b 0.8 to 1.5; preferably 1.1 to 1.5, and very especially 1.25 to 1.5;
c 0 to 0.3;
d 0 to 0.3;
e 0.01 to 0.3;
f 0;
x (3/2+5b/2);
y (2e+2 f);
z 0 to 1.0, especially 0.05 to 0.7, and very especially 0.3 to 0.5;
and also to red-tinged bismuth vanadate pigments of formula I wherein the variables have the following meanings:
b 0.8 to 1.5, especially 1.1 to 1.5, and very especially 1.25 to 1.5;
c 0.01 to 0.3;
d 0.01 to 0.3;
e 0.01 to 0.3;
f 0.01 to 0.3;
x (3/2+5b/2);
y (2e+2 f);
z 0 to 1.0, especially 0.05 to 0.7, and very especially 0.3 to 0.5.

Special preference is also given to zirconium-containing red-tinged bismuth vanadate pigments of general formula I wherein the variables have the following meanings:
b 0.8 to 1.5, especially 1.1 to 1.5, and very especially 1.25 to 1.5;
c 0;
d 0;
e 0.01 to 0.3;
f 0 to 0.3;
x (3/2+5b/2);
y (2e+2 f);
z 0 to 1.0, especially 0.05 to 0.7, and very especially 0.3 to 0.5.

Special preference is furthermore given to zirconium-containing red-tinged bismuth vanadate pigments of formula I wherein the variables have the following meanings:
b 0.8 to 1.5, especially 1.1 to 1.5, and very especially 1.25 to 1.5;
c 0;
d 0;
e 0.01 to 0.3;
f 0;
x (3/2+5b/2);

y (2e+2 f);

z 0 to 1.0, especially 0.05 to 0.7, and very especially 0.3 to 0.5.

The pigments of formula I according to the invention may be solid solutions, which have different crystalline modifications according to their chemical composition.

The present invention relates also to a process for the preparation of pigments of formula I according to the invention, which comprises treating an aqueous mixture comprising bismuth, vanadium and zirconium salts and, if desired, salts of elements selected from the group consisting of calcium, molybdenum, silicon and fluorine, for from 2 to 30 hours in a pH range of from 4.5 to 8.

The sequence in which the salts are mixed with one another is generally immaterial.

A preferred embodiment of the present invention relates to a process for the preparation of pigments of formula I according to the invention, which comprises mixing (a1) a solution of a bismuth salt, a zirconium salt and a calcium salt with a solution of a vanadate salt, a molybdate salt and a silicate salt, or (a2) a solution of a bismuth salt, a zirconium salt and a calcium salt with a solution of a vanadate salt and a molybdate salt, or (a3) a solution of a bismuth salt and a zirconium salt with a solution of a vanadate salt and a silicate salt, or (a4) a solution of a bismuth salt and a zirconium salt with a solution of a vanadate salt, and (b) then maintaining the resulting mixture for from 2 to 30 hours in a pH range of from 4.5 to 8.

In the process steps (a1), (a2), (a3) or (a4), the required starting materials are usually mixed together in the form of their ions in solutions. The particles precipitated do not generally exhibit pigment properties but are usually X-ray amorphous and often gel-like.

In process step (b), the particles, which are generally precipitated in amorphous form, are crystallised. Advantageously, the particles obtained after process steps (a1), (a2), (a3) or (a4) are not isolated, for example by means of filtration and washing, but are directly crystallised.

The process steps (a1), (a2), (a3) or (a4) are preferably carried out by blending a bismuth salt solution comprising, if desired, a calcium salt and a zirconium salt, or a zirconium salt alone, with a vanadate solution comprising, if desired, a molybdate and a silicate, or a silicate alone.

In a further embodiment of the process according to the invention, the process steps (a1), (a2), (a3) or (a4) can, however, also be carried out by blending the individual salt solutions with one another simultaneously or successively.

A further embodiment of the present process relates also to the process steps (a1), (a2), (a3) or (a4) wherein the bismuth salt solution and the vanadate solution are introduced in parallel.

Generally, stirring is carried out during or after parallel introduction, especially during introduction.

In process step (b), the mixture obtained in process steps (a1) to (a4) is adjusted to a pH range of from pH 4 to 8.5, preferably from 5 to 8, by addition of a base, especially an inorganic base.

In a variant of process step (b), the pH can also be adjusted stepwise, for example to a pH in the range from 2 to 4.5, especially from 3 to 4, over 60 minutes and then to a pH range from pH 4 to 8.5, preferably from 5 to 8.

In some cases it has proved advantageous for the mixture to be heated, especially heated stepwise, for example to from 50 to 110° C., advantageously from 80 to 100° C., during or after the increase in pH.

Generally, the bismuth-, calcium- and zirconium-containing salt solution or the bismuth- and zirconium-containing salt solution is used as initial charge and the vanadate-, molybdate- and silicate-containing solution or the vanadate- and molybdate-containing solution or the vanadate- and silicate-containing solution or the vanadate-containing solution is added thereto.

Blending of the various reaction solutions of process steps (a1), (a2), (a3) or (a4) can be carried out portionwise or continuously by feeding in simultaneously or also discontinuously by using one solution as initial charge and adding the other solution(s) thereto. The blending of the solutions is preferably carried out with stirring, where appropriate under elevated pressure, or in an apparatus provided with a high-performance stirrer.

Heating can be carried out, for example, by electrical heating of the outside of the reaction vessel or by directly introducing steam into the reaction vessel.

In a particular embodiment of the process according to the invention it is, if desired, possible in process step (b) to carry out dilution with from one to three times the amount of water, based on the total amount of the mixture obtained from process step (a1), (a2), (a3) or (a4).

The total time for process step (b) can vary according to the batch size. Generally, from 2 to 30 hours and preferably from 5 to 25 hours are sufficient.

When c is >0, the molar ratio of bismuth salt to calcium salt is generally in the range from 1:0.001 to 1:0.5, preferably in the range from 1:0.001 to 1:0.3 and very especially in the range from 1:0.01 to 1:0.1.

The molar ratio of bismuth salt to zirconium salt is generally in the range from 1:0.01 to 1:0.5, preferably in the range from 1:0.01 to 1:0.3 and very especially in the range from 0.01 to 1:0.2.

The molar ratio of bismuth salt used for the reaction to the vanadium salt is generally in the range from 1:0.8 to 1:3, preferably in the range from 1:0.8 to 1:2 and very especially in the range from 1:0.8 to 1:1.5.

When d is >0, the molar ratio of bismuth salt to molybdenum salt is generally in the range from 1:0.001 to 1:0.5, preferably in the range from 1:0.001 to 1:0.3 and very especially in the range from 1:0.01 to 1:0.1.

When f is >0, the molar ratio of bismuth salt to silicate is generally in the range from 1:0.001 to 1:0.5, preferably in the range from 1:0.001 to 1:0.3 and very especially in the range from 1:0.01 to 1:0.2.

The upper concentration limits of the salt solutions mentioned above are, in general, determined by the solubility of the salts used, although it is advantageous to use diluted solutions especially for better stoichiometric control during the mixing procedure for the solutions under consideration in accordance with the invention. The concentrations of the salt solutions are usually in the range from 0.001 to 50% by weight and preferably in the range from 0.01 to 30% by weight.

The solutions are advantageously mixed in the temperature range from 10 to 100° C., preferably from 20 to 70° C.

Bismuth acetate or bismuth nitrate, preferably bismuth (III) nitrate, is generally used as the bismuth salt.

In a particular embodiment, bismuth(III) salt solutions can be prepared, for example, by dissolving bismuth nitrate, e.g. $Bi(NO_3)_3.5H_2O$, in e.g. from 1.0 to 4.0N nitric acid or in acetic acid.

Calcium salt solutions can be prepared, for example, by dissolving $Ca(NO_3)_2.4H_2O$ in, for example, water or in from 1.0 to 4.0N nitric acid or in acetic acid.

Vanadate solutions can be prepared, for example, from alkali metal vanadate, such as sodium, lithium or potassium vanadate, e.g. meta-vanadate, $NaVO_3$, or ortho-vanadate, $Na_3VO_4$, or alkali metal polyvanadates, or from vanadium pentoxide by dissolution in basic solution.

As molybdate or silicate there are used, for example, the corresponding sodium, potassium, lithium or ammonium salts, or the corresponding oxides are dissolved in basic solution.

In the case of the silicate solution, sodium or potassium water glass solutions, especially sodium water glass solutions, are generally used.

The acid solutions advantageously have a pH in the range from 0 to 6, preferably from 0 to 3. The basic solutions usually have a pH in the range from 9 to 14, preferably between 11 and 14.

A further embodiment of the present process relates to process steps (a1), (a2), (a3) or (a4) wherein the solution of a calcium salt or a zirconium salt or of a mixture thereof is first prepared, optionally with the solution of a molybdate or silicate or of a mixture thereof, and blended with the solutions of a bismuth salt and a vanadate.

If desired, the solutions of the calcium salt or zirconium salt or of a mixture thereof, optionally with the solution of a molybdate or silicate or of a mixture thereof, can be subjected to ageing.

The ageing temperature is generally in the range from 0 to 80° C., especially from 10 to 30° C.

The blending of the solutions of the calcium salt or zirconium salt or molybdate or silicate or mixtures can be carried out portionwise first with the solution of a bismuth salt and then with that of a vanadate or, vice versa, first with the solution of a vanadate and then with that of a bismuth salt, or simultaneously with a solution of bismuth salt and vanadate.

The blending of the salts is carried out generally in the temperature range from 0 to 100° C., preferably in the range from 10 to 30° C.

The pH range after blending the individual salt solutions is preferably from 0 to 7 and especially from 0 to 3.

Suitable inorganic bases are, for example, alkali metal hydroxides such as sodium, potassium or lithium hydroxide, preferably in the form of an aqueous solution having a concentration, for example, in the ranges from 40 to 60% by weight, from 20 to 40% by weight, from 10 to 30% by weight or from 5 to 15% by weight.

The present invention relates also to a preferred embodiment of the process for the preparation of pigments of formula I according to the invention, which comprises blending (a1) a solution comprising a bismuth salt, a zirconium salt and a calcium salt with a solution comprising a vanadate salt, a molybdate salt and a silicate salt, or (a2) a solution comprising a bismuth salt, a zirconium salt and a calcium salt with a solution comprising a vanadate salt and a molybdate salt, or (a3) a solution comprising a bismuth salt and a zirconium salt with a solution comprising a vanadate salt and a silicate salt, or (a4) a solution comprising a bismuth salt and a zirconium salt with a solution of a vanadate salt, and (b) then treating the resulting mixture for from 2 to 30 hours in a pH range of from 4.5 to 8, wherein (c) in steps (a1), (a2), (a3) or (a4) and/or (b) fluoride ions are added.

Fluoride ions can be used, for example, in the form of a separate aqueous solution which is mixed with the bismuth salt and vanadate solution in process steps (a1), (a2), (a3) or (a4). It is also possible to blend fluoride ions with the bismuth salt solution or vanadate solution and to combine the latter two solutions by mixing them with one another. Preference is given to fluoride-containing vanadate solutions. A further possibility is for both the bismuth salt solution and the vanadate salt solution to contain fluoride ions.

Furthermore, it is also possible in accordance with the process according to the invention to mix in the fluoride ions directly before or during process step (b), a possible procedure being to add the mixture prepared according to process step (a1), (a2), (a3) or (a4) to the fluoride ions or, vice versa, to add the fluoride ions to the said mixture. In the process according to the invention it is also possible to divide the addition of the fluoride ions between the process steps (a1), (a2), (a3) or (a4) and (b).

According to the invention preference is given to adding the fluoride ions in process step (b).

The amount of fluoride ions can vary. Between 0.01 and 3 mol of a fluoride salt, based on 1 mol of bismuth, is advantageously used, but preferably between 0.8 and 2.0 mol and very especially between 1 mol and 1.5 mol of fluoride salt.

Suitable fluoride salts are, for example, alkali metal, alkaline earth metal and ammonium fluorides, e.g. sodium fluoride, potassium fluoride and ammonium fluoride, especially sodium fluoride and potassium fluoride, which are advantageously used in the form of aqueous solutions.

In a further preference of the process according to the invention, the pigments of formula I according to the invention are prepared by diluting, in process steps (b), with from 1 to 3 times the amount of water.

The dilution is generally performed by blending the mixture prepared according to process step (a1), (a2), (a3) or (a4) with an aqueous fluoride-containing solution. The blending is carried out using generally known methods of blending by adding the aqueous fluoride solution to the mixture comprising the bismuth/vanadate salts or, vice versa, by adding the bismuth/vanadate salts to the aqueous fluoride solution.

The dilution with aqueous fluoride solution can be performed in the temperature range from 10 to 110° C., especially in the range from 50 to 110° C. and very especially from 80 to 100° C.

The present invention relates also to bismuth vanadate pigments of formula (I) obtainable by the processes according to the invention.

For working up the compounds obtained according to the invention, the pH is generally increased to the range from 8 to 12, preferably from 8 to 10.

Preference is given to subsequently stirring for from 5 to 30 minutes.

The temperature during pH adjustment and subsequent stirring is usually in the range from 10 to 110° C., preferably in the range from 10 to 100° C. In the process according to the invention it is also possible to change the temperature during pH adjustment and subsequent stirring. It is possible, for example, during subsequent stirring to effect cooling to a temperature in the range from 10 to 100° C., preferably from 10 to 80° C.

Isolation is generally carried out in conventional manner, for example by filtering off, washing the filter cake with water to remove soluble salts, drying and pulverising.

Drying is generally carried out at a temperature in the range from 90 to 750° C. and preferably from 110 to 500° C.

Drying is preferably carried out in the range from one hour to 48 hours and especially in the range from 5 to 20 hours.

Suitable drying apparatuses such as drying cabinets, paddle dryers, spray dryers and vacuum dryers will be generally known to the person skilled in the art. After drying, the pigment is generally disagglomerated and ground using methods known to the person skilled in the art, for example by sieving or centrifuging.

In order to improve the properties of the pigment, such as stability with respect to heat, light and chemical reactions, it is advantageous to apply an inorganic or organic coating material to the surface of the compounds obtained according to the invention, during their preparation or preferably after the process steps described above, by treatment in accordance with methods that are known and, for example, described in U.S. Pat. No. 3,370,971, U.S. Pat. No. 3,639,133, U.S. Pat. No. 4,046,588 and U.S. Pat. No. 5,123,965. The treatment can be carried out in one or more steps. For that purpose, the bismuth vanadate pigments are treated, for example, with inorganic substances, e.g. aluminium compounds, iron compounds, chromium compounds, magnesium compounds, titanium compounds, antimony compounds, cerium compounds, zirconium compounds, zinc compounds or silicon compounds, or mixtures thereof, such as, especially, zinc/aluminium mixtures.

Suitable coating materials are generally inorganic substances, such as

- phosphates and pyrophosphates of zinc, aluminium, calcium, magnesium, bismuth, iron or chromium, e.g. zinc phosphate $[Zn_3(PO_4)_2]$, aluminium phosphate $[AlPO_4]$, calcium phosphate $[Ca_3(PO_4)_2]$, calcium pyrophosphate $[Ca_2P_2O_7]$, magnesium phosphate $[Mg_3(PO_4)_2]$, bismuth phosphate $[BiPO_4]$, iron(II) phosphate $[Fe_3(PO_4)_2]$, iron(III) phosphate $[FePO_4]$, chromium(II) phosphate $[CrPO_4]$ and also calcium salts of oligophosphates, e.g. the calcium salt of Graham's salt, or a mixture of phosphates;
- hydroxides, e.g. aluminium hydroxide $[Al(OH)_3]$, zinc hydroxide $[Zn(OH)_2]$, iron(II) hydroxide $[Fe(OH)_2]$, iron(III) hydroxide $[Fe(OH)_3]$, strontium hydroxide $[Sr(OH)_2]$, calcium hydroxide $[Ca(OH)_2]$, bismuth hydroxide $[Bi(OH)_3]$, barium hydroxide $[Ba(OH)_2]$, chromium(II) hydroxide $[Cr(OH)_3]$, vanadium(IV) hydroxide $[V(OH)_4]$, cobalt(II) hydroxide $[Co(OH)_2]$, manganese hydroxide $[Mn(OH)_2]$ or a mixture of hydroxides;
- oxides or hydrated oxides, e.g. tin(II) oxide hydrate $[SnO.xH_2O]$, tin(IV) oxide hydrate $[SnO_2.xH_2O]$, titanium dioxide hydrate $[TiO_2.xH_2O]$, zirconium dioxide hydrate $[ZrO_2.xH_2O]$, cerium(III) oxide hydrate $[Ce_2O_3.xH_2O]$, cerium(IV) oxide hydrate $[CeO_2.xH_2O]$, silicon dioxide $[SiO_2]$, antimony(III) oxide hydrate $[Sb_2O_3.xH_2O]$, antimony(V) oxide hydrate $[Sb_2O_5.xH_2O]$ or a mixture of oxides or hydrated oxides.

Also suitable are carbonates, nitrates, fluorides, fluorosilicates, molybdates, tungstates or sulfates, e.g. calcium carbonate $[CaCO_3]$, magnesium carbonate $[MgCO_3]$, bismuth oxynitrate $[BiO(NO_3)]$, bismuth oxyfluoride $[BiOF]$, calcium hexafluorosilicate $[CaSiF_6]$, calcium molybdate $[CaMoO_4]$, especially sulfates, e.g. calcium sulfate $[CaSO_4]$, or mixtures thereof, especially $CaSO_4$.

Also possible are any combinations of phosphates, hydroxides, oxides and hydrated oxides and salts that can be applied to the pigments.

Preference is given to the use of hydroxides and phosphates of zinc or aluminium and especially the phosphates of zinc and aluminium. Special preference is given to a mixture of zinc phosphate and aluminium phosphate.

The amount of coating material is advantageously in the range from 1 to 50% by weight, preferably in the range from 5 to 30% by weight and especially in the range from 8 to 20% by weight, based on the total weight of the treated pigment.

The present invention accordingly relates also to compositions comprising the bismuth vanadate pigments of formula I according to the invention to the surface of which a coating material has been applied.

Furthermore, a preference of the present invention relates to compositions comprising the bismuth vanadate pigments of formula I according to the invention to the surface of which there has been applied a coating material of aluminium compounds, iron compounds, chromium compounds, magnesium compounds, titanium compounds, antimony compounds, cerium compounds, zirconium compounds, zinc compounds or silicon compounds, or zinc phosphate or mixtures thereof such as, especially, zinc/aluminium mixtures.

The present invention relates also to a process for the preparation of the above compositions, wherein the pigments of formula I are treated with a coating material.

Furthermore, the present invention relates to a process for the preparation of the above compositions, wherein a coating material of aluminium compounds, iron compounds, chromium compounds, magnesium compounds, titanium compounds, antimony compounds, cerium compounds, zirconium compounds, zinc compounds or silicon compounds, or mixtures thereof is applied to the surface of the pigments of formula I.

In order to improve certain pigment properties, the products obtained according to the invention may additionally be treated with texture-improving agents, for example with long-chain aliphatic alcohols, esters, acids or salts, amines or amides thereof, and with waxes or resinous substances, for example abietic acid, or hydrogenation products, esters or salts thereof, and also with non-ionic, anionic or cationic surface-active agents.

The products obtained in accordance with the invention may, if desired, be converted into non-dusty pigment preparations using conventional methods such as described, for example, in U.S. Pat. No. 4,762,523.

The present invention therefore relates also to the use of the pigments of formula (I) according to the invention in the preparation of non-dusty pigment preparations.

The present invention accordingly relates also to a process for the preparation of non-dusty pigments, wherein a) the pigments of formula (I) are blended with a surface-active substance, b) drying is then carried out, and then c) mixing with dust-binding agents is carried out d) until the smear point is reached.

The mixing of pigment of formula (I) with the surface-active substances is generally carried out using known methods of blending, such as stirring, mixing or kneading.

The pigments of formula (I) may, if desired, also comprise water.

The amount of water relative to the pigment is generally selected in the range from 80 to 5% by weight, preferably in the range from 50 to 10% by weight, based on the total amount of substances used.

If desired, the mixture comprising pigment of formula (I) and the surface-active compound may be filtered and isolated in the form of the filter residue.

The mixture comprising pigment of formula (I) and the surface-active compound, or the filter residue, is dried at temperatures in the range from 30 to 150° C.

The dried mixture is generally blended with a dust-binding agent such as mineral oil, the boiling point of which is preferably above 70° C., waxes or water.

From 10 minutes to 2 hours, especially from 15 minutes to 45 minutes, are generally required to reach the smear point, the product generally being obtained in the form of pourable, non-dusty, fine granules.

The mentioned 'smear point' as understood by the present invention is reached when the pourable, fine granules mentioned above have formed, are non-dusty and, to a slight extent, result in a smear effect on the walls of the mixing equipment. The smear point is reached when there has not yet been formed a cohesive cement-like mass, as defined, for example, according to the oil absorption value determination in accordance with DIN 53199 (see also Ullmanns Encyklopaedie der technischen Chemie [Ullmann's Encyclopedia of Technical Chemistry], 4 th Edition, Volume 18, page 565).

In order to reach the smear point there are usually used generally known mixing apparatuses, such as kneaders or mixers and other apparatuses that produce sufficient shear stress to bring the mixture to the shear point.

Surface-active substances may usually be long-chain polyesters as described, for example, in DE-A 2 162 484.

In general, the amount of surface-active substance relative to the pigment of formula (I) is selected in the range from 0.5 to 10% by weight, based on the total amount of substances used.

In general, the amount of dust-binding agents relative to the pigment of formula (I) is selected in the range from 0.5 to 25% by weight, based on the total amount of substances used.

In general, the amount of pigment of formula (I) relative to the dust-binding agent is selected in the range from 75 to 97.5% by weight, based on the total amount of substances used.

The present invention relates also to compositions comprising
(a) from 75 to 97.5% by weight of pigment of formula (I),
(b) from 0.5 to 10% by weight of surface-active substance and
(c) from 0.5 to 25% by weight of dust-binding agents, the sum of the components adding up to 100% by weight.

The present invention relates also to the use of the bismuth vanadate pigments according to the invention in pigmenting high molecular weight organic material.

The high molecular weight organic material to be coloured in accordance with the invention may be of natural or synthetic origin. It usually has an average molecular weight of from $10^5$ to $10^7$ g/mol and may consist of, for example, natural resins or drying oils, rubber or casein or modified natural substances, such as chlorinated rubber, oil-modified alkyd resins, viscose, or cellulose ethers or esters, such as ethylcellulose, cellulose acetate, propionate or butyrate, and also nitrocellulose, but especially completely synthetic organic polymers (thermosetting plastics and thermoplastics), as can be obtained by polymerisation, for example by polycondensation or polyaddition. The class of the polymers includes, for example, polyolefins, such as polyethylene, polypropylene, polyisobutylene, also substituted polyolefins, such as polymerisation products of monomers such as vinyl chloride, vinyl acetate, styrene, acrylonitrile, acrylic acid esters, methacrylic acid esters, fluoropolymerisation products, such as polyfluoroethylene or polytrifluorochloroethylene or a tetrafluoroethylene/lhexafluoropropylene mixed polymerisation product, and also copolymerisation products of the said monomers, especially ABS (acrylonitrile/butadiene/styrene) or EVA (ethylene/vinyl acetate). The series of the polyaddition and polycondensation resins includes, for example, condensation products of formaldehyde with phenols, so-called phenoplasts, and condensation products of formaldehyde and urea, thiourea and melamine, so-called aminoplasts, also the polyesters used as surface-coating resins, either saturated, such as alkyd resins, or unsaturated, such as maleic resins; also linear polyesters, polyamides, polyurethanes, polycarbonates, polyphenylene oxides or silicones, and silicone resins.

The said high molecular weight compounds may be present individually or in mixtures as plastic masses, melts or in the form of spinning solutions, surface-coatings or printing inks. Depending on the intended use, it has proved advantageous to use the bismuth vanadate pigments according to the invention as toners or in the form of preparations. The pigments obtained according to the invention are especially suitable for pigmenting coating materials, especially automotive lacquers.

For the purpose of pigmenting the high molecular weight organic substances with the compounds obtained in accordance with the invention, the latter, for example in the form of masterbatches, are admixed with the high molecular weight organic substances using roll mills or mixing or grinding apparatuses. The pigmented material is then brought into the desired final form using methods known per se such as calendering, compression moulding, extrusion, coating, pouring or injection moulding. In order to produce non-rigid formed articles or to reduce their brittleness, it is frequently desirable to incorporate so-called plasticisers into the high molecular weight organic compounds prior to forming. There may be used as plasticisers, for example, esters of phosphoric acid, phthalic acid or sebacic acid. The plasticisers can be incorporated into the polymers before or after the incorporation of the compounds obtained according to the invention. It is also possible, in order to achieve different colour shades, to add to the high molecular weight organic substances, in addition to the compounds obtained in accordance with the invention, fillers or other colour-imparting constituents such as white, coloured or black pigments, in any desired amounts.

For the purpose of pigmenting surface-coatings, coating materials and printing inks, the high molecular weight organic materials and the pigments obtained according to the invention, optionally together with additives, such as fillers, other pigments, siccatives or plasticisers, are finely dispersed or dissolved together in an organic solvent or solvent mixture, it being possible to use a procedure in which the individual components are dispersed or dissolved separately or in which a plurality thereof are dispersed or dissolved together, and only then all of the components combined.

The bismuth vanadate pigments according to the invention may be used in an amount of from 0.001 to 75% by weight, preferably from 0.01 to 50% by weight, based on the high molecular weight organic material to be pigmented.

The colourations obtained, for example in plastics, fibres, surface-coatings or prints, are distinguished especially by the extraordinarily high purity of colour shade and high colour strength. Preferred areas of use are in the industrial and vehicle surface-coating sectors for producing lead-free, weather-fast, brilliant single colour shades and, in admixtures with other pigments, for establishing particular colour shades. They also have good dispersibility, good fastness to overspraying, to migration, to heat, to light and to weathering and are distinguished by good gloss.

The bismuth vanadate pigments according to the invention are, however, very especially distinguished by their non-toxic properties. The red-tinged shade that is achieved with these pigments extends the colour space and, as a result, the potential for use of bismuth vanadate pigments. As a result of their high brilliance and colour strength they are excellently suitable as single pigments and also as combination pigments in mixed colourations, especially in trichromatic colourations, for which high colour strengths are desirable. The bismuth vanadate pigments according to the invention accordingly have excellent properties for colouring plastics, printing inks and aqueous and/or solvent-containing surface-coatings, especially automotive lacquers.

EXAMPES

Example 1

262.7 g of bismuth nitrate pentahydrate, 8.7 g of calcium nitrate tetrahydrate and 13.5 g of zirconium oxynitrate are dissolved in 290.0 g of nitric acid (58% by weight) and 1750 ml of water, with stirring. To the solution obtained there is added, over a period of 5 minutes, with intensive stirring, a vanadate solution consisting of 129.3 g of sodium orthovanadate, 15.1 g of sodium hydroxide, 9.6 g of sodium molybdate and 15.9 g of sodium water glass solution (27% $SiO_2$ by weight) in 1650 ml of water. Over a period of a few minutes, the pH of the resulting suspension is raised to a value of 3.5 by adding sodium hydroxide solution (50% by weight). After stirring for 60 minutes, the pH of the suspension is increased to a value of 6.2 over a period of 5 minutes by adding sodium hydroxide solution (20% by weight) and stirring is carried out for a further 30 minutes. The suspension obtained is divided into three equal portions and processed further in accordance with the following procedure.

Example 1a)

A third of the suspension described in Example 1 above is diluted with 2 litres of water in which 7.1 g of sodium fluoride have been dissolved and is then heated to 100° C. and stirred at that temperature for 10 hours. During that time, the pH is adjusted to 6.2 every 2 hours, using nitric acid. After the end of the reaction time, the pH is increased to 9.8 using sodium hydroxide solution and stirring is then carried out at 100° C. for 10 minutes. After isolating the solid by filtering at 90° C. (the filter cake cools down during filtration), the filter cake is washed until salt-free and dried at 400° C. for 16 hours. After the product has cooled down, it is disagglomerated in a powder mill (Culatti no. 3 micromill with a 1 mm sieve insert) by brushing the pigment through the sieve insert of the powder mill.

The pigment obtained is applied in an alkyd/melamine surface-coating according to the following procedure:

37.0 g of an alkyd/melamine surface-coating having the following composition:

18.7 g of a short-chain alkyd resin (Setal® 84xx70 (70%) from Synthese)

7.2 g of a melamine resin (Setamin® US 132 BB71 (70%) from Synthese)

7.8 g of SOLVESSO® 100 (mixture of aromatic hydrocarbons from Exxon)

1.7 g of n-butanol 0.8 g of DEPANOL® J (terpene hydrocarbon)

0.8 g of isophorone together with 11.0 g of the pigment prepared in Example 1a and 40 g of glass beads (3 mm diameter) are introduced into a 100 ml glass vessel with a screw-top closure and are dispersed on a Scandex apparatus until a fineness of 10 $\mu$m (Hegman gauge) has been achieved.

The surface-coating is then spread out on a contrast card (wet film thickness 50 $\mu$m), exposed to the air at room temperature for 20 minutes and subsequently heated at a temperature of 130° C. for 30 minutes.

Colour measurements are made according to the CIELAB method on an X-Rite colour spectrophotometer, XR SP68T, using the CGREC (Version 1.5) software and yield the following values: L* of 86.6 and h of 88.5.

All measurements are carried out using a measurement angle of 10° under D65 standard light.

Example 1b)

Procedure and application as described in Example 1a, except that the pH of the suspension is lowered to 6.0 during the reaction period at 100° C. The colour measurements yield the following values: L* of 86.7 and h of 88.1.

Example 1c)

Procedure and application as described in Example 1a, except that the pH of the suspension is lowered to 5.9 during the reaction period at 100° C. The colour measurements yield the following values: L* of 86.1 and h of 87.7.

Example 2)

262.7 g of bismuth nitrate pentahydrate, 4.4 g of calcium nitrate tetrahydrate and 10.8 g of zirconium oxynitrate are dissolved in 130.0 g of nitric acid (58% by weight) and 1750 ml of water, with stirring. To the solution obtained there is added, over a period of 5 minutes, with intensive stirring, a vanadate solution consisting of 129.3 g of sodium orthovanadate, 14.6 g of sodium hydroxide, 4.8 g of sodium molybdate and 13.0 g of sodium water glass solution (27% $SiO_2$ by weight) in 1940 ml of water. Over a period of a few minutes, the pH of the resulting suspension is raised to a value of 3.5 by adding sodium hydroxide solution (50% by weight). After stirring for 60 minutes, the pH of the suspension is increased to a value of 5.9 over a period of 5 minutes by adding sodium hydroxide solution (20% by weight) and stirring is carried out for a further 90 minutes. A third of the suspension obtained is processed further in accordance with the following procedure.

Example 2a)

Procedure and application as described in Example 1a except that, during the reaction period at 100° C., the suspension obtained in Example 2 is maintained at a pH of 5.9 instead of at a pH of 6.2, by adding nitric acid. The colour measurements yield the following values: L* of 85.0 and h of 87.0.

Example 3)

262.7 g of bismuth nitrate pentahydrate, 4.4 g of calcium nitrate tetrahydrate and 10.8 g of zirconium oxynitrate are dissolved in 130.0 g of nitric acid (58% by weight) and 1750 ml of water, with stirring. The solution obtained is heated to 70° C. and, over a period of 5 minutes, with intensive stirring, a vanadate solution consisting of 129.3 g of sodium orthovanadate, 14.6 g of sodium hydroxide, 4.8 g of sodium molybdate and 13.0 g of sodium water glass solution (27% $SiO_2$ by weight) in 1940 ml of water is added thereto. Over a period of a few minutes, the pH of the resulting suspension is raised to a value of 3.5 by adding sodium hydroxide solution (50% by weight). After stirring for 60 minutes, the pH of the suspension is increased to a value of 5.9 over a period of 5 minutes by adding sodium hydroxide solution (20% by weight) and stirring is carried out for a further 90 minutes. (A third of the suspension obtained is processed further according to the following procedure.)

Example 3a)

A third of the suspension obtained according to Example 3 is diluted with 3 litres of water in which 3.5 g of sodium fluoride have been dissolved and is then heated to 100° C. and stirred at that temperature for 3 hours. During that time, the pH of the suspension is maintained at 5.9 by adding nitric acid. The suspension is allowed to cool to room temperature while stirring for 16 hours and is then re-heated to 100° C., while maintaining the pH constant at 5.9, and is reacted for a further 5 hours. After the end of the reaction time, the pH is increased to 9.8 using sodium hydroxide solution and stirring is then carried out at 100° C. for 10 minutes. After isolating the solid by filtering at 90° C. (the filter cake cools down during filtration), the filter cake is washed until salt-free and dried at 400° C. for 16 hours. After the product has cooled down, it is disagglomerated in a powder mill (Culatti no. 3 micromill with a 1 mm sieve insert) by brushing the pigment through the sieve insert of the powder mill.

Application is carried out as described in Example 1a.

The colour measurements yield the following values: L* of 85.3 and h of 87.0.

Example 4)

1050.5 g of bismuth nitrate pentahydrate, 17.6 g of calcium nitrate tetrahydrate and 94.6 g of zirconium oxynitrate are dissolved in 570.0 g of nitric acid (58% by weight) and 7.2 litres of water, with stirring. The solution obtained is heated to 70° C. and, over a period of 30 minutes, with intensive stirring, a vanadate solution consisting of 560.6 g of sodium orthovanadate, 64.6 g of sodium hydroxide, 19.2 g of sodium molybdate and 90.0 g of sodium water glass solution (27% $SiO_2$ by weight) in 32 litres of water is added thereto, the temperature being maintained constant at 70° C. Over a period of a few minutes, the pH of the resulting suspension is raised to a value of 2.5 by adding sodium hydroxide solution (50% by weight). After stirring for 60 minutes, the pH of the suspension is increased to a value of 7.2 over a period of 15 minutes by adding sodium hydroxide solution (20% by weight) and stirring is carried out for a further 30 minutes. After adding 48 g of sodium fluoride to the suspension, the temperature is increased to 85° C. and stirring is carried out at that temperature for 20 hours. After the end of the reaction time, the pH is increased to 9.8 using dilute sodium hydroxide solution and stirring is carried out for 30 minutes. After the solid has been isolated by filtering, it is washed until salt-free and dried at 400° C. for 16 hours. After the product has cooled down, it is disagglomerated in a powder mill (Culatti no. 3 micromill with a 1 mm sieve insert) by brushing the pigment through the sieve insert of the powder mill.

Application is carried out as described in Example 1a.

The colour measurements yield the following values: L* of 84.3 and h of 85.7.

Example 5a)

87.5 g of bismuth nitrate pentahydrate, 1.5 g of calcium nitrate tetrahydrate and 4.5 g of zirconium oxynitrate are dissolved in 48.0 g of nitric acid (58% by weight) and 600 ml of water, with stirring. The solution obtained is heated to 70° C. and, over a period of 5 minutes, with intensive stirring, a vanadate solution consisting of 43.1 g of sodium orthovanadate, 4.7 g of sodium hydroxide, 1.6 g of sodium molybdate and 4.3 g of sodium water glass solution (27% $SiO_2$ by weight) in 3 litres of water is added thereto. Over a period of a few minutes, the pH of the resulting suspension is raised to a value of 2.5 by adding sodium hydroxide solution (50% by weight). After stirring for 60 minutes, the pH of the suspension is increased to a value of 7.2 over a period of 5 minutes by adding sodium hydroxide solution (20% by weight) and stirring is carried out for a further 60 minutes. After adding 4.0 g of sodium fluoride to the suspension, the temperature is increased to 95° C. and stirring is carried out at that temperature for 10 hours. After the end of the reaction time, the pH is increased to 9.8 using dilute sodium hydroxide solution and stirring is carried out for 15 minutes. After the solid has been isolated by filtering, it is washed until salt-free and dried at 100° C. for 16 hours. After the product has cooled down, it is disagglomerated in a powder mill (Culatti no. 3 micromill with a 1 mm sieve insert) by brushing the pigment through the sieve insert of the powder mill.

Application as described in Example 1

The colour measurements yield the following values: L* of 82.9 and h of 86.0.

Example 5b)

Procedure and application as described in Example 5a except that, after isolation and washing until salt-free, the solid is dried for 16 hours at 400° C. rather than at The colour measurements yield the following values: L* of 85.3 and h of 86.3.

Example 5c)

Procedure and application as described in Example 5a, except that the amounts of substances used are modified as follows:

weights of 5.6 g of zirconium oxynitrate, 5.4 g of sodium water glass solution, 44.6 g of sodium orthovanadate and 4.9 g of sodium hydroxide are used.

The colour measurements yield the following values: L* of 82.2 and h of 85.7.

Example 5d)

Procedure and application as described in Example 5a, except that the amounts of substances used are modified as follows:

weights of 5.6 g of zirconium oxynitrate, 5.4 g of sodium water glass solution, 44.6 g of sodium orthovanadate and 4.9 g of sodium hydroxide are used. Furthermore, the solid is dried at 400° C. rather than at 100° C.

The colour measurements yield the following values: L* of 84.8 and h of 85.7.

Example 5e)

Procedure and application as described in Example 5a, except that the amounts of substances used are modified as follows:

weights of 6.1 g of zirconium oxynitrate, 5.8 g of sodium water glass solution, 45.5 g of sodium orthovanadate and 5.0 g of sodium hydroxide are used.

The colour measurements yield the following values: L* of 82.4 and h of 85.6.

Example 5f)

Procedure and application as described in Example 5a, except that the amounts of substances used are modified as follows:

weights of 6.1 g of zirconium oxynitrate, 5.8 g of sodium water glass solution, 45.5 g of sodium orthovanadate and 5.0 g of sodium hydroxide are used. Furthermore, the solid is dried at 400° C. rather than at 100° C.

The colour measurements yield the following values: L* of 84.7 and h of 85.5.

Example 5g)

Procedure and application as described in Example 5a, except that the amounts of substances used are modified as follows:

weights of 7.9 g of zirconium oxynitrate, 7.5 g of sodium water glass solution, 49.2 g of sodium orthovanadate and 5.4 g of sodium hydroxide are used.

The colour measurements yield the following values: L* of 82.5 and h of 85.4.

Example 5h)

Procedure and application as described in Example 5a, except that the amounts of substances used are modified as follows:

weights of 7.9 g of zirconium oxynitrate, 7.5 g of sodium water glass solution, 49.2 g of sodium orthovanadate and 5.4 g of sodium hydroxide are used. Furthermore, the solid is dried at 400° C. rather than at 100° C.

The colour measurements yield the following values: L* of 83.7 and h of 84.6.

Example 6a)

78.8 g of bismuth nitrate pentahydrate and 7.1 g of zirconium oxynitrate are dissolved in 39.0 g of nitric acid (58% by weight) and 525 ml of water, with stirring. The solution obtained is heated to 70° C. and, over a period of 5 minutes, with intensive stirring, a warm (50° C.) vanadate solution consisting of 41.0 g of sodium orthovanadate and 1.9 g of sodium hydroxide in 3000 ml of water is added thereto, as a result of which the temperature drops to about 60° C. Over a period of a few minutes, the pH of the resulting suspension is raised to a value of 2.5 by adding sodium hydroxide solution (50% by weight). After stirring for 120 minutes, the pH of the suspension is increased to a value of 6.0 over a period of 5 minutes by adding sodium hydroxide solution (50% by weight) and stirring is carried out for a further 15 minutes. 0.42 g of sodium fluoride in solid form is added to the resulting suspension, which is then heated to 95° C. When that temperature has been reached, the pH of the suspension is adjusted to a value of 5.5 using dilute nitric acid, with stirring. After a reaction time of 24 hours, the pH is increased to 9.8 using dilute sodium hydroxide solution and stirring is carried out for 10 minutes. After the solid has been isolated by filtering, it is washed until salt-free and dried at 400° C. for 24 hours. After the product has cooled down, it is disagglomerated in a powder mill (Culatti no. 3 micromill with a 1 mm sieve insert) by brushing the pigment through the sieve insert of the powder mill. Application is carried out as described in Example 1a. The colour measurements yield the following values: L* of 84.5 and h of 90.7.

Example 6b)

Procedure and application as described in Example 6a, except that no sodium fluoride is added to the suspension after the pH has been increased to 6.0. The crystallisation time at 95° C. is 24 hours.

The colour measurements yield the following values: L* of 86.8 and h of 92.6.

Example 6c)

Procedure and application as described in Example 6a, except that 4.2 g of sodium fluoride are added to the suspension after the pH has been increased to 6.0. Crystallisation time at 95° C. is 18 hours.

The colour measurements yield the following values: L* of 85.8 and h of 90.3.

Example 6d)

Procedure and application as described in Example 6a, except that 8.4 g of sodium fluoride are added to the suspension after the pH has been increased to 6.0. Crystallisation time at 95° C. is 16 hours.

The colour measurements yield the following values: L* of 83.6 and h of 84.8.

Example 6e)

Procedure and application as described in Example 6a, except that 10.5 g of sodium fluoride are added to the suspension after the pH has been increased to 6.0. Crystallisation time at 95° C. is 14 hours.

The colour measurements yield the following values: L* of 83.5 and h of 85.1.

Example 6f)

Procedure and application as described in Example 6a, except that 12.6 g of sodium fluoride are added to the suspension after the pH has been increased to 6.0. Crystallisation time at 95° C. is 8 hours.

The colour measurements yield the following values: L* of 83.3 and h of 85.3.

Example 6g)

Procedure and application as described in Example 6a, except that 14.7 g of sodium fluoride are added to the suspension after the pH has been increased to 6.0. Crystallisation time at 95° C. is 8 hours.

The colour measurements yield the following values: L* of 84.2 and h of 86.2.

Example 6h)

Procedure and application as described in Example 6a, except that 16.8 g of sodium fluoride are added to the suspension after the pH has been increased to 6.0. Crystallisation time at 95° C. is 8 hours.

The colour measurements yield the following values: L* of 85.0 and h of 86.8.

Example 6i)

Procedure and application as described in Example 6a, except that 18.9 g of sodium fluoride are added to the suspension after the pH has been increased to 6.0. Crystallisation time at 95° C. is 6 hours.

The colour measurements yield the following values: L* of 85.0 and h of 87.9.

Example 6j)

Procedure and application as described in Example 6a, except that 21.0 g of sodium fluoride are added to the suspension after the pH has been increased to 6.0. Crystallisation time at 95° C. is 5 hours.

The colour measurements yield the following values: L* of 86.8 and h of 91.2.

Example 7a)

109.5 g of bismuth nitrate pentahydrate, 1.9 g of calcium nitrate tetrahydrate and 9.9 g of zirconium oxynitrate are dissolved in 53.0 g of nitric acid (58% by weight) and 730 ml of water, with stirring. The solution obtained is heated to 70° C. and, over a period of 3 minutes, with intensive stirring, a warm (50° C.) vanadate solution consisting of 51.2 g of sodium orthovanadate, 2.0 g of sodium molybdate dihydrate, 9.4 g of sodium water glass solution (27% $SiO_2$ by weight) and 2.4 g of sodium hydroxide in 3000 ml of water is added thereto, as a result of which the temperature drops to about 60° C. Over a period of a few minutes, the pH of the resulting suspension is raised to a value of 2.5 by adding sodium hydroxide solution (50% by weight). After stirring for 60 minutes, the pH of the suspension is increased to a value of 7.2 over a period of 5 minutes by adding sodium hydroxide solution (50% by weight) and stirring is carried out for a further 15 minutes. 0.42 g of sodium fluoride in solid form is added to the resulting suspension, which is then heated to 95° C. When that temperature has been reached, the pH of the suspension is adjusted to a value of 5.5 using dilute nitric acid, with stirring. After a reaction time of 18 hours, the pH is increased to 9.8 using sodium hydroxide solution and stirring is carried out for 10 minutes. After the solid has been isolated by filtering, it is washed until salt-free and dried at 400° C. for 16 hours. After the product has cooled down, it is disagglomerated in a powder mill (Culatti no. 3 micromill with a 1 mm sieve insert) by brushing the pigment through the sieve insert of the powder mill.

Application is carried out as described in Example 1a.

The colour measurements yield the following values: L* of 87.1 and h of 91.4.

Example 7b)

Procedure and application as described in Example 7a, except that 8.4 g of sodium fluoride are added to the suspension after the pH has been increased to 7.2. The crystallisation time at 95° C. is 18 hours.

The colour measurements yield the following values: L* of 86.0 and h of 88.5.

Example 7c)

Procedure and application as described in Example 7a, except that 14.7 g of sodium fluoride are added to the suspension after the pH has been increased to 7.2. The crystallisation time at 95° C. is 8 hours.

The colour measurements yield the following values: L* of 85.1 and h of 87.4.

Example 7d)

Procedure and application as described in Example 7a, except that 18.4 g of sodium fluoride are added to the suspension after the pH has been increased to 7.2. The crystallisation time at 95° C. is 8 hours.

The colour measurements yield the following values: L* of 85.8 and h of 88.6.

Example 8a)

78.8 9 of bismuth nitrate pentahydrate, 1.4 g of calcium nitrate tetrahydrate and 7.1 g of zirconium oxynitrate are dissolved in 39.0 g of nitric acid (58% by weight) and 525 ml of water, with stirring. The solution obtained is heated to 70° C. and, over a period of 4 minutes, with intensive stirring, a vanadate solution consisting of 36.9 g of sodium orthovanadate, 1.4 g of sodium molybdate dihydrate and 1.7 g of sodium hydroxide in 3000 ml of water is added thereto, as a result of which the temperature drops to about 30° C. Over a period of a few minutes, the pH of the resulting suspension is raised to a value of 2.5 by adding sodium hydroxide solution (50% by weight). After stirring for 60 minutes, the pH of the suspension is increased to a value of 7.2 over a period of 5 minutes by adding sodium hydroxide solution (50% by weight) and stirring is carried out for a further 15 minutes. 0.42 g of sodium fluoride in solid form is added to the resulting suspension, which is then heated to 95° C. When that temperature has been reached, the pH of the suspension is adjusted to a value of 5.5 using dilute nitric acid, with stirring. After a reaction time of 18 hours, the pH is increased to 9.8 using sodium hydroxide solution and stirring is carried out for 10 minutes. After the solid has been isolated by filtering, it is washed until salt-free and dried at 400° C. for 24 hours. After the product has cooled down, it is disagglomerated in a powder mill (Culatti no. 3 micromill with a 1 mm sieve insert) by brushing the pigment through the sieve insert of the powder mill.

Application is carried out as described in Example 1a.

The colour measurements yield the following values: L* of 87.7 and h of 91.1.

Example 8b)

Procedure and application as described in Example 8a, except that 4.2 g of sodium fluoride are added to the suspension after the pH has been increased to 7.2. The crystallisation time at 95° C. is 16 hours.

The colour measurements yield the following values: L* of 87.7 and h of 91.3.

Example 8c)

Procedure and application as described in Example 8a, except that 8.4 g of sodium fluoride are added to the suspension after the pH has been increased to 7.2. The crystallisation time at 95° C. is 16 hours.

The colour measurements yield the following values: L* of 86.2 and h of 88.8.

Example 8d)

Procedure and application as described in Example 8a, except that 10.5 g of sodium fluoride are added to the suspension after the pH has been increased to 7.2. The crystallisation time at 95° C. is 16 hours.

The colour measurements yield the following values: L* of 85.3 and h of 87.6.

Example 8e)

Procedure and application as described in Example 8a, except that 12.6 g of sodium fluoride are added to the suspension after the pH has been increased to 7.2. The crystallisation time at 95° C. is 16 hours.

The colour measurements yield the following values: L* of 84.8 and h of 86.4.

Example 8f)

Procedure and application as described in Example 8a, except that 14.7 g of sodium fluoride are added to the suspension after the pH has been increased to 7.2. The crystallisation time at 95° C. is 10 hours.

The colour measurements yield the following values: L* of 84.7 and h of 86.5.

Example 8g)

Procedure and application as described in Example 8a, except that 16.8 g of sodium fluoride are added to the suspension after the pH has been increased to 7.2. The crystallisation time at 95° C. is 10 hours.

The colour measurements yield the following values: L* of 84.8 and h of 87.0.

Example 8h)

Procedure and application as described in Example 8a, except that 18.9 g of sodium fluoride are added to the suspension after the pH has been increased to 7.2. The crystallisation time at 95° C. is 10 hours.

The colour measurements yield the following values: L* of 85.6 and h of 87.6.

Example 8i)

Procedure and application as described in Example 8a, except that 21.0 9 of sodium fluoride are added to the suspension after the pH has been increased to 7.2. The crystallisation time at 95° C. is 10 hours.

The colour measurements yield the following values: L* of 85.2 and h of 87.8.

What is claimed is:

1. A zirconium-containing, red-tinged bismuth vanadate pigment of general formula (I), $$BiV_bO_x \cdot Ca_c(MoO_4)_d \cdot Zr_eSi_fO_y \cdot F_z \quad (I)$$

wherein the variables are
b 0.8 to 1.5;
c 0 to 0.3;
d 0 to 0.3;
e 0.01 to 0.3;
f 0 to 0.3;
x (3/2+5b/2);
y (2e+2 f);
z 0.05 to 1.0.

2. A bismuth vanadate pigment according to claim 1, wherein f has the value zero.

3. A bismuth vanadate pigment according to claim 1, wherein the variables are
b 0.8 to 1.5;
c 0.01 to 0.3;
d 0.01 to 0.3;
e 0.01 to 0.3;
f 0.01 to 0.3;
x (3/2+5b/2);
y (2e+2 f);
z 0.5 to 1.0.

4. A bismuth vanadate pigment according to claim 1, wherein the variables are
b 0.8 to 1.5;
c 0;
d 0;
e 0.01 to 0.3;
f 0 to 0.3;
x (3/2+5b/2);
y (2e+2 f);
z 0.5 to 1.0.

5. A bismuth vanadate pigment according to claim 1, wherein the variables are
b 0.8 to 1.5;
c 0;
d 0;
e 0.01 to 0.3;
f 0;
x (3/2+5b/2);
y (2e+2 f);
z 0.5 to 1.0.

6. A bismuth vanadate pigment according to claim 1, which has a brightness value L* in the range from 79 to 91.

7. A process for the preparation of bismuth vanadate pigment according to claim 1 which comprises treating an aqueous mixture comprising bismuth, vanadium fluorine and zirconium salts and, optionally, salts of elements selected from the group consisting of calcium, molybdenum, and silicon, for from 2 to 30 hours in a pH range of from 4.5 to 8.

8. A bismuth vanadate pigment obtained by the process according to claim 7.

9. A composition comprising a pigment according to claim 1, wherein said pigment further includes a surface coating.

10. A composition comprising
    (a) from 75 to 97.5% by weight of pigment of formula (I) according to claim 1,
    (b) from 0.5 to 10% by weight of surface-active substance and
    (c) from 0.5 to 25% by weight of dust-binding agents,
    the sum of the components adding up to 100% by weight.

11. A process for pigmenting high molecular weight organic material comprising incorporating a pigment according to claim 1 into high molecular weight organic material.

12. A composition comprising a pigment according to claim 8 wherein said pigment further includes a surface coating.

13. A composition comprising
    (a) from 75 to 97.5% by weight of pigment of formula (I) according to claim 8,
    (b) from 0.5 to 10% by weight of surface-active substance and
    (c) from 0.5 to 25% by weight of dust-binding agents,
    the sum of the components adding up to 100% by weight.

14. A process for pigmenting high molecular weight organic material comprising incorporating a pigment according to claim 8 into high molecular weight organic material.

15. A composition comprising a pigment prepared according to claim 7 wherein said pigment further includes a surface coating.

16. A composition comprising
    (a) from 75 to 97.5% by weight of pigment prepared according to claim 7,
    (b) from 0.5 to 10% by weight of surface-active substance and
    (c) from 0.5 to 25% by weight of dust-binding agents,
    the sum of the components adding up to 100% by weight.

17. A process for pigmenting high molecular weight organic material comprising incorporating a pigment prepared according to claim 7 into high molecular weight organic material.

18. A process for pigmenting high molecular weight organic material comprising incorporating a composition according to claim 10 into high molecular weight organic material.

19. A process for the preparation of bismuth vanadate pigment according to claim 3, which comprises treating an aqueous mixture comprising bismuth, vanadate and zirconium salts and, salts of elements selected from the group consisting of calcium, molybdenum, silicon and fluorine, for from 2 to 30 hours in a pH range of from 4.5 to 8.

* * * * *